(12) United States Patent
Soya

(10) Patent No.: US 6,633,581 B2
(45) Date of Patent: *Oct. 14, 2003

(54) SERIAL COMMUNICATION APPARATUS

(75) Inventor: Takashi Soya, Ninomiya-machi (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/143,389

(22) Filed: Aug. 28, 1998

(65) Prior Publication Data

US 2003/0095565 A1 May 22, 2003

(30) Foreign Application Priority Data

Aug. 28, 1997 (JP) .............................................. 9-233094

(51) Int. Cl.$^7$ .............................................. H04L 29/00
(52) U.S. Cl. ......................... 370/463; 340/3.1; 340/3.54
(58) Field of Search ......................... 340/3.1, 3.3, 3.32, 340/3.5, 3.54, 825.52; 370/420, 421, 463

(56) References Cited

U.S. PATENT DOCUMENTS 6,014,084 A * 1/2000 Tice ........................... 340/3.32
6,134,604 A * 10/2000 Soya et al. ............ 340/286.09

* cited by examiner

*Primary Examiner*—Melvin Marcelo
(74) *Attorney, Agent, or Firm*—Fitzpatrick, Cella, Harper & Scinto

(57) ABSTRACT

A data transfer system capable of effectively performing serial communication by dividing communication lines into one or plural systems and using the divided lines, according to the number of communication IC's connected on the communication line and a load condition connected to the communication IC is provided. In this system, plural communication lines 410 and 411 are prepared, and the lines 410 and 411 are time divisionally selected according to the contents of connection information set in a select register 462, whereby the serial communication between communication IC's 402 to 405 and a communication controller 401 can be effectively performed.

17 Claims, 10 Drawing Sheets

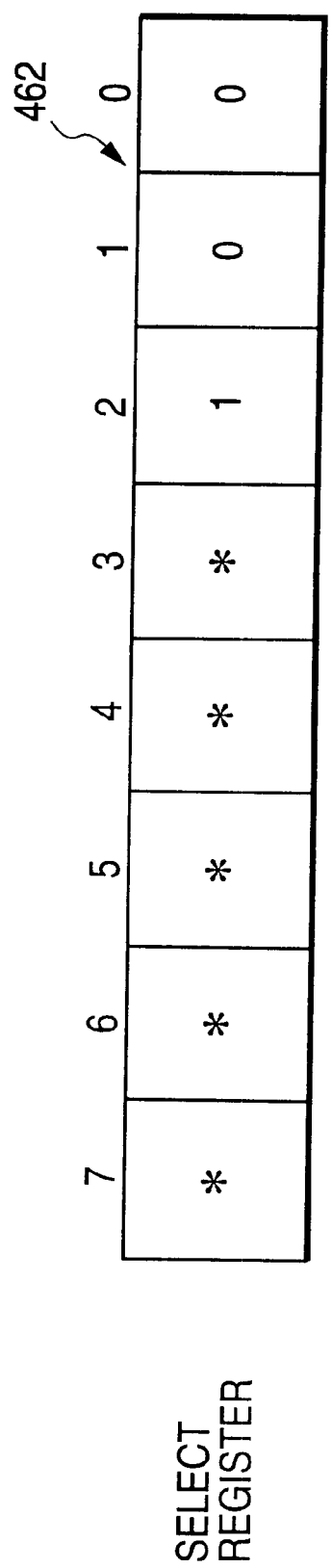
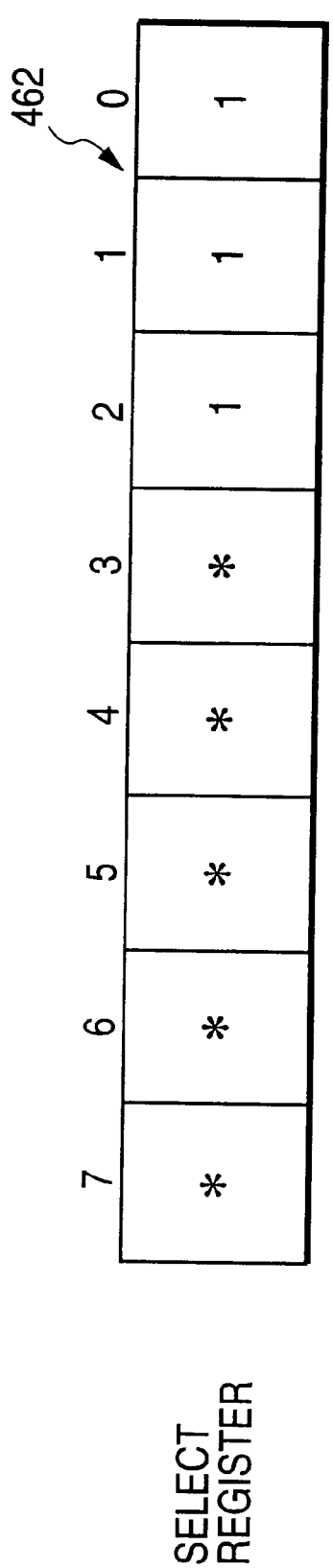

FIG. 6A

| | |
|---|---|
| 0 | 0 |
| 1 | 1 |
| 2 | 0 |
| 3 | * |
| 4 | * |
| 5 | * |
| 6 | * |
| 7 | * |

470

SELECT REGISTER (1)

FIG. 6B

| | |
|---|---|
| 0 | 1 |
| 1 | 0 |
| 2 | 1 |
| 3 | * |
| 4 | * |
| 5 | * |
| 6 | * |
| 7 | * |

471

SELECT REGISTER (2)

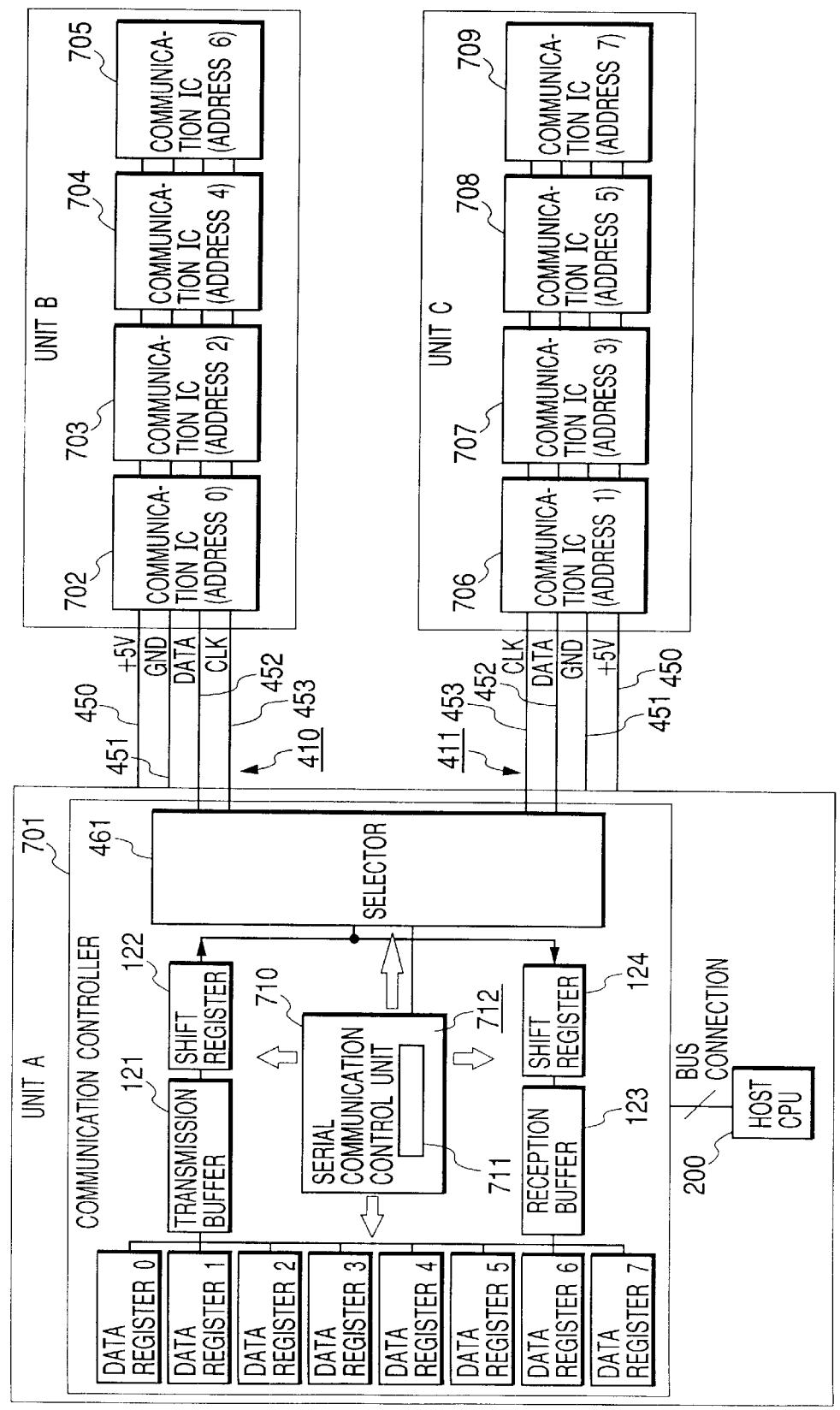

SERIAL COMMUNICATION APPARATUS

BACKGROUND OF THE INVENTION

1. Field of the Invention

The present invention relates to a communication apparatus such as a serial communication apparatus or the like which communicates with one or plural communication devices on a communication line.

2. Related Background Art

FIG. 11 shows an structural example of a conventional serial communication system. In this system, a communication controller 101, a communication IC 102 to which a motor driver 105 for driving a motor 104 is connected, and a communication IC 103 to which plural sensors 106 are connected are cascade-connected through a set of signal lines consisting of a total of four lines, i.e., a +5V line acting as a power supply line, a ground (GND) line, a sync clock (CLK) line for serial communication and a data (DATA) line.

The eight communication IC's can be maximally cascade-connected to one communication controller 101, and an inherent address (address 0, address 1, . . . ) can be designated to each communication IC. In FIG. 11, the two communication IC's 102 and 103 are cascade-connected to the controller 101. On the other hand, eight data registers 0 to 7 are provided inside the controller 101. These registers 0 to 7 are respectively corresponding to the inherent addresses (addresses 0 to 7) of the communication IC's, and each register is selected by a serial communication control unit 120.

Such the communication controller 101 as above communicates, i.e., transmission or reception, with the communication IC corresponding to each of the data registers. At a transmission time, data is transmitted from the controller 101 through a transmission buffer 121 and a shift register 122. On the other hand, at a reception time, data is received from the communication IC through a shift register 124 and a reception buffer 123.

FIG. 12 shows a structural example in a case where the above-described serial communication system is used inside an image formation apparatus 1 such as a copy machine or the like.

In FIG. 12, a host CPU (not shown) and a communication controller 201 are bus-connected to each other by means of an address bus, a data bus and a control signal bus. Further, the communication controller 201, a communication IC 202 to which a motor driver 208 for driving a motor 206 positioned at an appropriate location inside the apparatus is connected, a communication IC 203 to which a motor driver 209 for driving a motor 207, a communication IC 204 to which plural sensors 210 are connected, and a communication IC 205 to which plural sensors 211 are connected are connected through a set of signal lines. Thus, data communication between the communication controller 201 and each of the communication IC's 202 to 205 is performed in response to a transmission instruction or a reception instruction issued from the host CPU.

Irrespective of locations of these communication IC's 202 to 205 in the apparatus, an inherent address (address 0, address 1, address 2, . . . ) is determined for each communication IC. Thus, by designating the address in a communication frame (pulse column), the communication controller 201 performs the transmission/reception to/from the communication IC of which address corresponds to the designated address.

Subsequently, the outline of an operation of the above-described serial communication system will be explained hereinafter. In case of performing a transmission operation for transmitting a predetermined-phase data to drive or rotate the motor 206, the host CPU stands a transmission flag for performing the transmission in the communication controller 201 and writes transmission data into the data register 0. When the transmission data is written, the controller 201 sends a predetermined-frequency pulse column to a CLK line.

By using such a system structure, it becomes possible to operate a number of motors and sensors positioned at various locations in the apparatus by using the four cascade-connected signal lines and read the information from the signal lines. In this conventional serial communication system, one address is represented by eight bits, and the information of the eight addresses is managed between the communication controller and the communication IC's. However, according to an agreement of a communication data format, such the structure of the conventional system can be modified to an adequately optimized structure. In addition, by setting plural communication controller functions and thus increasing the number of the signal lines corresponding to the plural functions, the number of the communication IC's can be increased.

Generally, in a case where the number of the communication IC's connected to a set of communication lines is small, if the communication IC's are connected respectively to the separate communication lines, i.e., a multi-system connection state is set, and then the serial communication is performed, processing efficiency may be improved rather than the cascade-connected structure.

For example, for the communication IC connected to a load of which delay is not permitted or a load of which speed is low, it is better to select the address of which communication priority order is as higher as possible. For this reason, in the case where the number of the communication IC's is small, it is better to set the multi-system connection state as numerous as possible and then perform the serial communication.

On the contrary, the communication IC connected to a load of which delay is permitted to some extent is not so affected by the communication priority order. Therefore, in a case where the number of such the communication IC's is large, also in consideration of system assembly or the like, it is more effective to connect all the communication IC's to one set of the communication lines and then perform the serial communication.

However, in the above-described conventional serial communication system, the number of the communication lines can not arbitrarily changed according to the number of the communication IC's, load conditions of the motor, the sensor and the like connected to the communication IC's, and the like. As a result, there has been a problem that the serial communication can not be effectively performed.

For example, as shown in FIG. 11, in the case where merely the two communication IC's 102 and 103 are used in one unit although the eight communication IC's can be maximumly cascade-connected to one set of the communication lines, efficiency in the serial communication becomes seriously degraded, it depends on the load conditions, though.

SUMMARY OF THE INVENTION

Therefore, an object of the present invention is to provide a data transfer system which can effectively perform, according to the number of communication IC's connected to communication lines and load conditions connected to the communication IC's, serial communication by dividing the communication lines into one or plural systems and using the divided-system communication lines.

BRIEF DESCRIPTION OF THE DRAWINGS

FIG. 2 is a view for explaining a structural example of a select register;

FIG. 4 is a block diagram showing an another structural example of the select register;

FIGS. 6A and 6B are views for explaining a still another structural example of the select registers;

FIG. 7 is a block diagram showing a structural example of a serial communication system in an image formation apparatus according to a second embodiment of the present invention;

DETAILED DESCRIPTION OF PREFERRED EMBODIMENTS

Hereinafter, embodiments of the present invention will be explained in detail with reference to the attached drawings.

Figure 11:
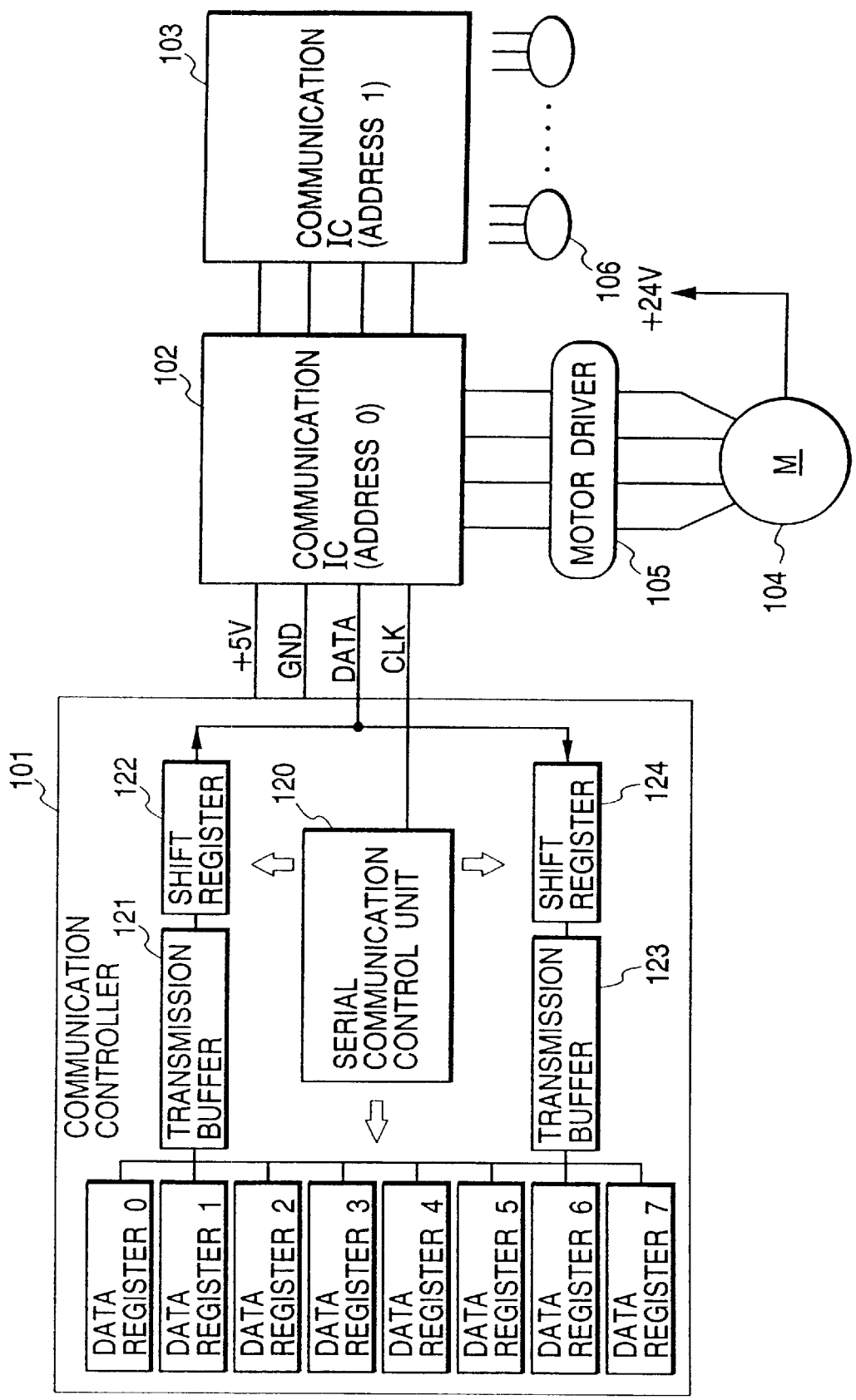
FIG. 11 is a block diagram showing a structural example of a serial communication system before applying the present invention.
Figure 12:
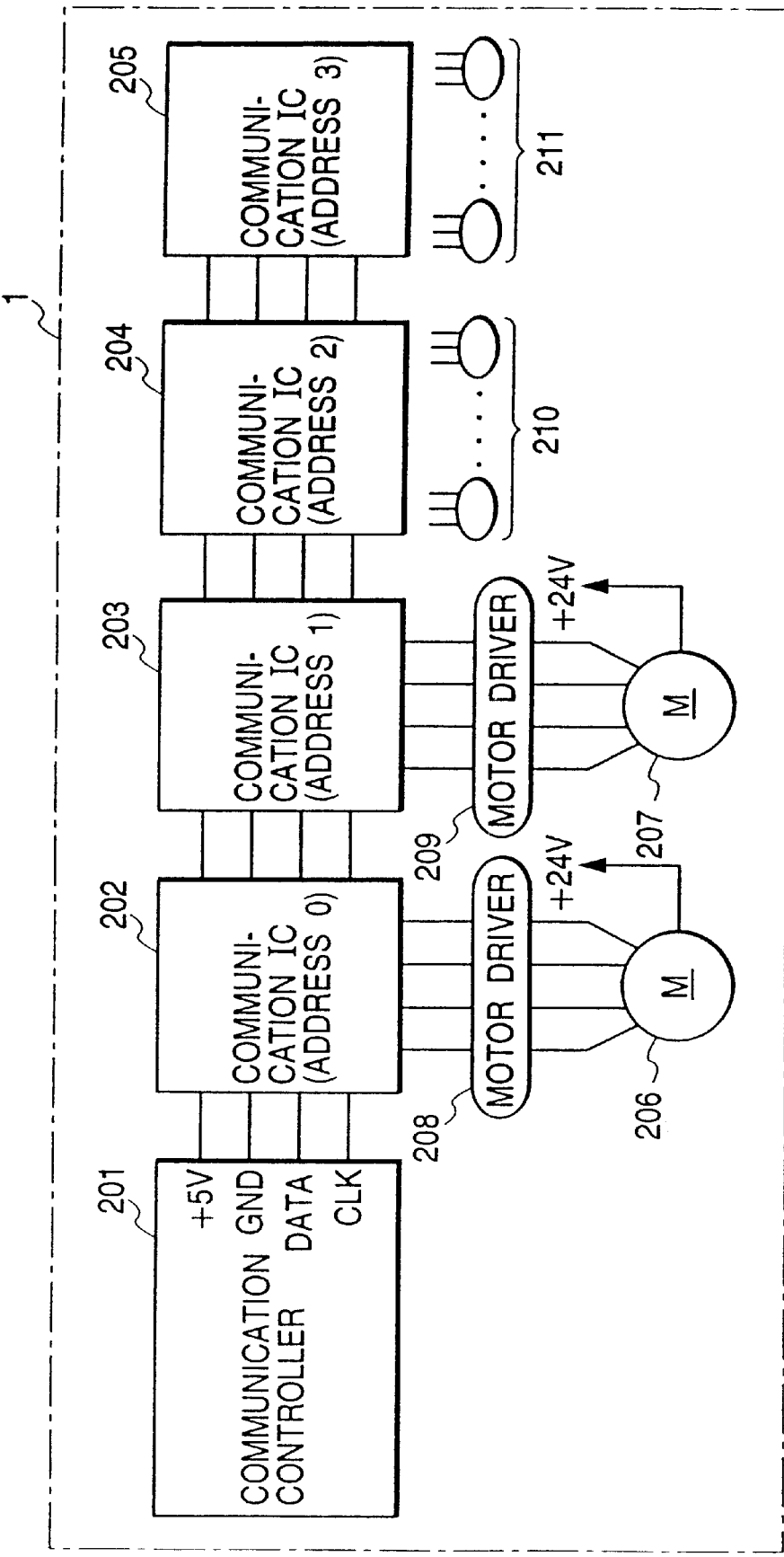
FIG. 12 is a block diagram showing a structural example of the serial communication system in an image formation apparatus before applying the present invention.

Initially, a first embodiment of the present invention will be explained with reference to FIGS. 1 to 6A, 6B, 9 and 10. It should be noted that explanation of the same parts as those shown in FIGS. 11 and 12 is omitted, and these parts are added with the same reference numerals as those shown in FIGS. 11 and 12.

Figure 1:
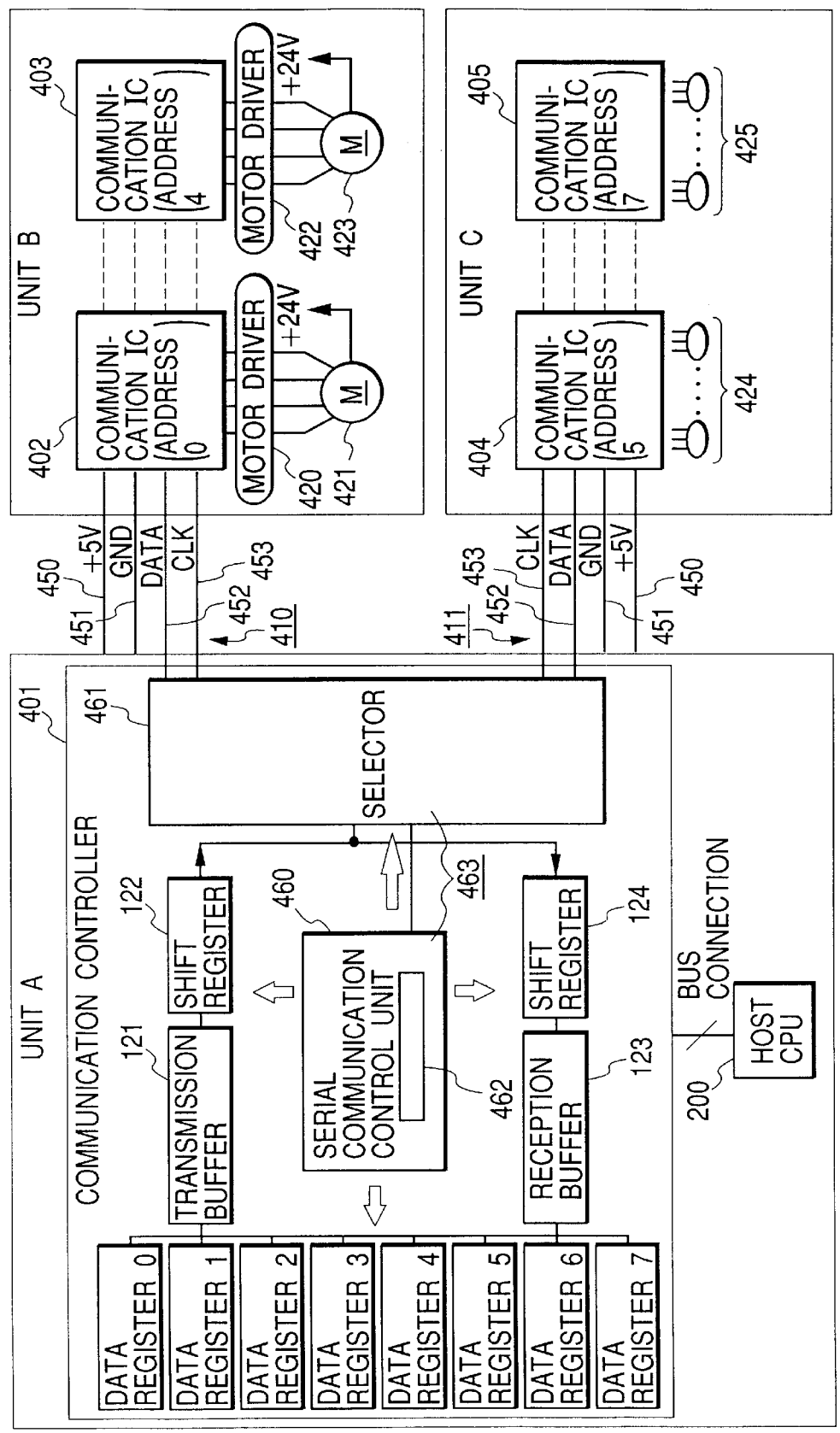
FIG. 1 is a block diagram showing a structural example of a serial communication system in an image formation apparatus according to a first embodiment of the present invention.

FIG. 1 shows a schematic structure of a serial communication system according to the present invention. For example, this system can be structured as an image formation apparatus of an electrophotographic system such as a copy machine or the like, or structured as an information process system which manages information or data among plural information process apparatuses (e.g., personal computers). Hereinafter, an example of a case where the system is structured as the image formation system will be explained.

Units A to C are contained in the image formation apparatus. The unit A is structured as a control unit for a main body of the apparatus, and controls serial communication of the unit A with the unit B and following each unit. Five communication IC's 402 (address 0) to 403 (address 4) are provided as communication means in the unit B (communication IC's of addresses 1 to 3 are not shown). Further, three communication IC's 404 (address 5) to 405 (address 7) are provided as communication means in the unit C (communication IC of address 6 is not shown).

Motor drivers 420 and 422 respectively driving motors 421 and 423 positioned at predetermined locations (e.g., at paper feeding unit and at paper conveying unit) inside the apparatus are connected to the communication IC's 402 and 403, respectively. Further, plural sensors 424 and 425 positioned at predetermined locations (e.g., at paper feeding cassette and around photosensitive drum) inside the apparatus are connected to the communication IC's 404 and 405, respectively. It should be noted that combinations of the sensor, the motor and the like connected to the communication IC's 402 to 405 are not limited to the above-described structure.

The unit A containing a communication controller 401 and the unit B containing the communication IC's 402 to 403 are connected to each other by means of a set of communication lines (referred as communication line) 410, and the unit A and the unit C containing the communication IC's 404 to 405 are connected to each other by means of a set of communication lines (referred as communication line) 411. These two lines 410 and 411 are connected to each other by means of a +5V line 450, a GND line 451, a CLK line 453 and a DATA line 452.

Here, an internal structure of the unit A according to the present invention is explained. In the unit A, a host CPU 200 which controls the image formation apparatus, and the communication controller 401 which acts as a communication control means for controlling serial communication wherein predetermined data is time-serially transmitted or received on the DATA line 452 are provided. The host CPU 200 is bus-connected to the communication controller 401 and thus manages a communication instruction and data to the controller 401.

The communication controller 401 is composed of data registers 0 to 7, a serial communication control unit 460, a selector 461, a transmission buffer 121, a shift register 122, a reception buffer 123 and a shift register 124. The data registers 0 to 7 are one-to-one corresponding to the communication IC's 402 (address 0) to 405 (address 7).

The serial communication control unit 460 contains a select register 462 shown in FIG. 2. In the register 462, connection state information representing that the communication IC's 402 to 405 respectively corresponding to the data registers 0 to 7 are being connected to which of the communication lines 410 and 411 is set. The information to be set in the register 462 is determined according to the number of the communication IC's and load conditions of the communication IC's. In addition, the information has been previously programmed in the host CPU 200, and is set by the host CPU 200 at an initializing time (i.e., when image formation apparatus is powered). As above, since the host CPU 200 sets the connection state information in the select register 462 at the initializing time, even if the communication IC's to be connected to the communication lines 410 and 411 are applied to the apparatus in any connection relation, the communication controller 401 may be identical. Therefore, the controller 401 can be used for various purposes as compared with conventional one, thereby decreasing cost.

Here, the connection state information set in the select register 462 is explained. In a case where the number of the communication IC's to be connected to one set of the communication lines is large, the information for selecting all the communication IC's connected to such one set of the communication lines is set. On the other hand, in a case where the number of the communication IC's connected to one set of the communication lines is small, the information for selecting the communication IC's connected to multi-system communication lines is set.

Then, based on the set information, the communication lines 410 and 411 are selected by the selector 461. The selector 461 and the select register 462 shown in FIG. 2 constitute a communication selection means 463 for time-divisionally selecting the two communication lines 410 and 411. Thus, the communication controller 401 communicates, i.e., transmission or reception, with the communication IC's 402 to 405 respectively corresponding to the data registers 0 to 7.

FIG. 2 shows a structure of the select register 462 in provided the communication controller 401. In the register 462, the information concerning a tail address of the communication IC's 402 to 403 connected to the communication line 410 is set. Therefore, the addresses of the communication IC's to be connected to the communication line 410 or 411 are automatically set according to the information contents set in the register 462.

For example, as shown in FIG. 2, it is assumed that the select register 462 is set to be "00000100" (i.e., tail address information =4). Thus, it can be understood that the five communication IC's 402 to 403 (from address 0 to address 4) are connected to the communication line 410. According to this, it can be also understood that the three communication IC's 404 to 405 (from address 5 to address 7) are connected to the communication line 411.

Subsequently, data transmission and reception operations which are performed by the communication controller 401 to the communication IC 402 will be explained.

Initially, an example of a case where the data transmission operation is performed by the controller 401 to the communication IC 402 will be explained. When a transmission flag is set by the host CPU 200 and the data is written in the data register 0, the serial communication control unit 460 selects the data register 0 corresponding to the communication IC 402. At this time, as shown in FIG. 2, the information (i.e., tail address information) used to judge which communication line the communication IC 402 of the address 0 corresponding to the data register 0 is being connected to has been already set in the select register 462.

Then, the serial communication control unit 460 transfers the data of the data register 0 in the communication controller 401 to the shift register 122 through the transmission buffer 121. At this time, the control unit 460 reads the information set in the select register 462 and relative to such a connection state. Thus, according to the read information relative to the connection state, it is judged that the communication IC 402 of the address 0 is being connected to the communication line 410 to which the communication IC 403 of the address 4 is connected as a tail terminal, so that the selector 461 selects the communication line 410. Then, a clock (CLK) and data (DATA) are outputted to the communication line 410. When the controller 401 communicates with the communication IC 402 in synchronism with such a clock output, the data is transmitted to the communication IC 402. Thus, the motor driver 420 drives and controls the motor 421 based on the transmitted data. At this time, any clock or data is not outputted to the communication line 411.

Subsequently, the details of the data transmission operation in which the data from the communication controller 401 is written into the communication IC 402 will be explained. In synchronism with the clock (CLK) outputted from the controller 401, the controller 401 and the communication IC 402 perform the data transmission process of the data in the data register 0 based on a transmission data format shown in FIG. 9.

Figure 9:
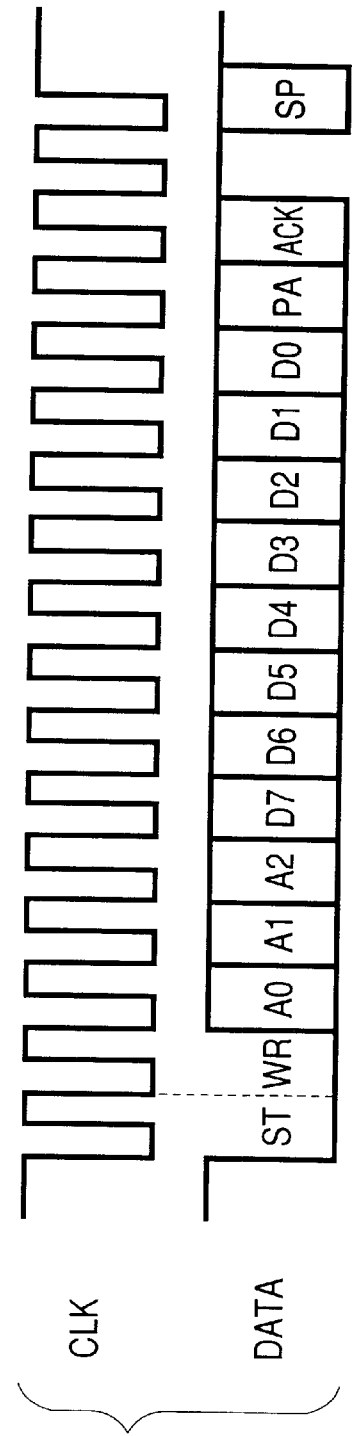
FIG. 9 is a view for explaining a structural example of a frame at a data transmission time.

In FIG. 9, the communication IC 402 recognizes communication starting responsive to a first fall of the CLK sent from the controller 401, and then confirms responsive to a next rise of the CLK whether or not a start bit (ST) (representing frame head) "L" is sent to the DATA line by the controller 401.

The communication IC 402 judges responsive to a next fall of the CLK whether it should perform the transmission operation ("L") or the reception operation ("H"). The data of following three clocks (A0 to A2) represent address bits. Then, the controller 401 sends the designated address on the DATA line. If the sent address is own, the communication IC 402 captures, from the next CLK, the total eight-bit data (D7 to D0) sent on the DATA line.

The controller 401 sends parity data (PA) responsive to a next fall of the CLK, and the communication IC 402 reads the sent parity data responsive to a next rise of the CLK and compares it with parity data (PA) calculated from the data (D7 to D0) by the IC 402 itself. If these two parity data are coincident with each other, the communication IC 402 considers the data (D7 to D0) to be effective and sends an acknowledge (ACK) ("L") to the controller 401. On the other hand, if these parity data are not coincident, the communication IC 402 considers the data (D7 to D0) to be ineffective and sends the ACK ("H") to the controller 401.

The communication controller 401 receives the ACK responsive to a next rise of the CLK. If the received ACK is "L", the controller 401 sends a stop bit (SP) "L" responsive to a next fall of the CLK. On the other hand, if the received ACK is "H", the controller 401 sends the stop bit (SP) "H" at the next fall of the CLK. This designated communication IC recognizes the stop bit (SP) responsive to a next rise of the CLK. If the stop bit (SP) is "L", the IC outputs the data. On the other hand, if the stop bit (SP) is "H", the IC does not output any data. According to such a sequence as above, the communication with the communication IC 402 is performed to rotate or drive the motor 421.

Subsequent to the above transmission operation to the communication IC 402, an example of a case where the communication controller 401 performs the reception operation from the communication IC 404 will be explained.

In the select register 462, information (i.e., tail address information) representing that the communication IC 404 corresponding to the data register 5 is being connected which communication line is set. When the host CPU 200 sets a reception flag, the serial communication control unit 460 reads the information relative to such a connection state set in the select register 462. Then, according to the read information relative to the connection state, the selector 461 selects the communication line 411. A clock (CLK) and data (DATA) are outputted to the selected line 411. By communicating with the communication IC 404 in synchronism with such a clock output, the data detected by the sensor 424 of the communication IC 404 is received by the controller 401. The received data is transferred to the data register 5 through the shift register 124 and the reception buffer 123. At this time, any clock or data is not outputted to the communication line 410.

Subsequently, the details of the data reception operation in which the communication controller 401 reads the data from the communication IC 404 will be explained. In synchronism with the clock outputted from the controller 401, the controller 401 and the communication IC 404 perform the process based on a reception data format shown in FIG. 10.

Figure 10:
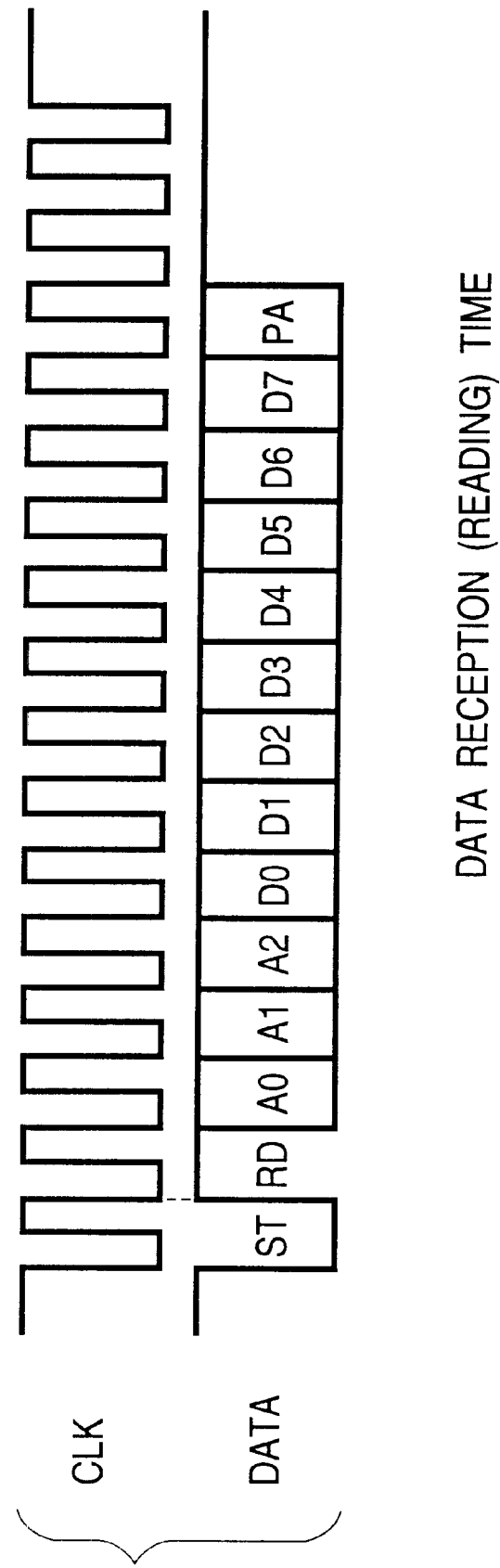
FIG. 10 is a view for explaining a structural example of a frame at a data reception time.

In FIG. 10, the communication IC 404 recognizes communication starting responsive to a first fall of the CLK sent from the controller 401, and then confirms responsive to a next rise of the CLK whether or not a start bit (ST) "L" is sent on the DATA line by the controller 401. The communication IC 404 judges responsive to a next fall of the CLK whether it should perform the transmission operation (WR) ("L") or the reception operation (RD) ("H").

The data of following three clocks (A0 to A2) represent address bits. Then, the controller 401 sends the designated address on the DATA line, and the communication IC 404 captures the sent address. If the captured address is own, the communication IC 404 sends, from the next CLK, the sensor data to the controller 401. The designated communication IC 404 sends, responsive to a next fall of the CLK, total eight-bit data (D0 to D7) on the DATA line. Then, the controller 401 captures the data (D0 to D7) responsive to the fall of the CLK. The controller 401 captures responsive to a next rise of the CLK parity data (PA) sent from the communication IC 404, and compares it with parity data (PA) calculated from the data (D0 to D7) by the controller 401 itself. If these two parity data are coincident with each other, the controller 401 considers the data (D0 to D7) to be effective. On the other hand, if these parity data are not coincident, the controller 401 considers the data (D0 to D7) to be ineffective. According to such a sequence as above, the communication with the communication IC 404 is performed to read a value from the sensor 424.

Figure 3:
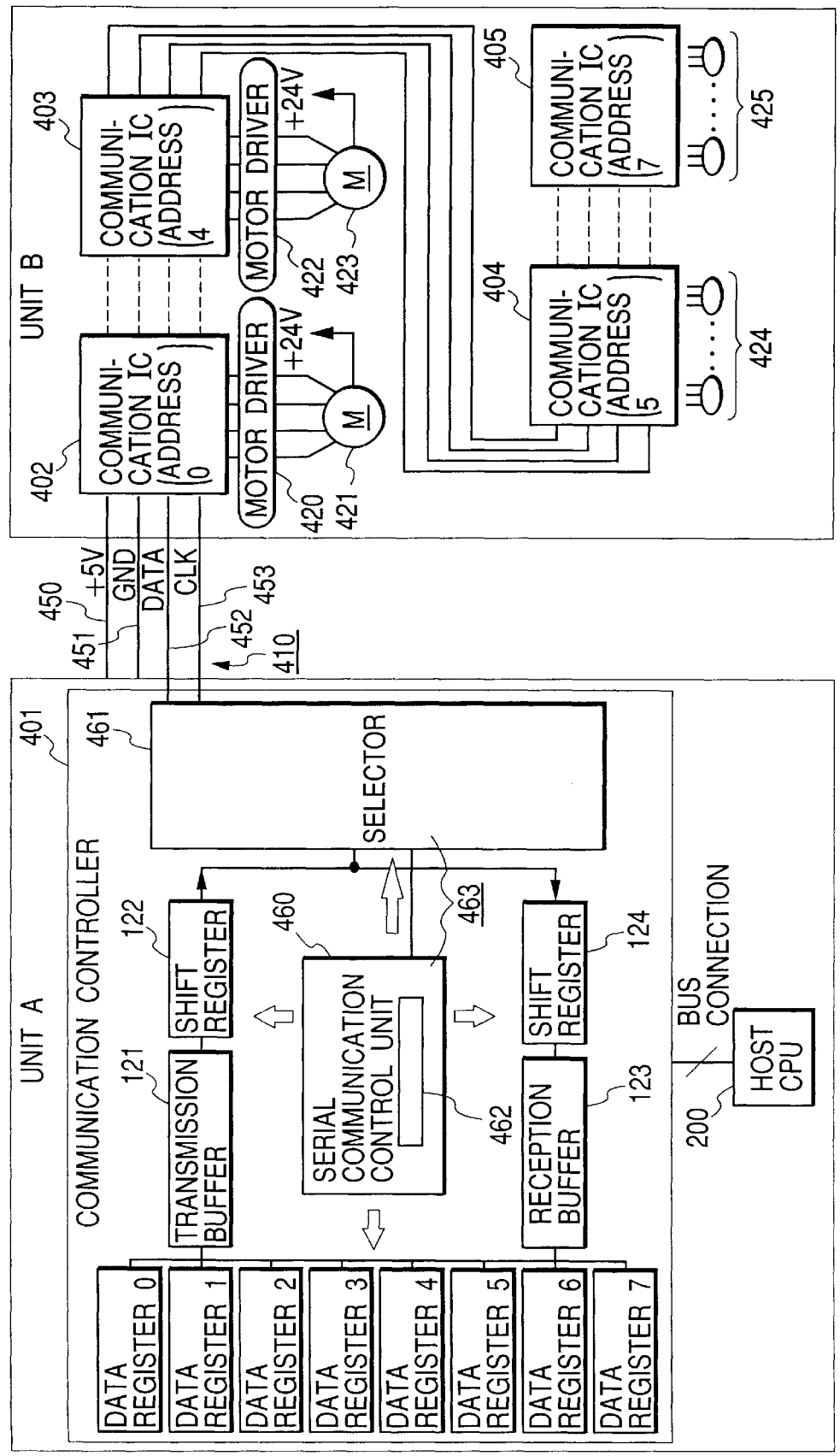
FIG. 3 is a block diagram showing an another structural example of the serial communication system.

As can be understood from the above-described transmission and reception operations, the selection control process of the communication lines 410 and 411 which is executed in the serial communication control unit 460 based on the information set in the select register 462 is performed in time divisional manner. That is, in the above example, the communication line 410 is initially selected for the transmission operation to the communication IC 402 of address 0, and the communication line 411 is then selected for the reception operation from the communication IC 404 of address 5. Such the line selection is time-divisionally performed based on the information set in the select register 462. As previously described, the information used to determine the order of line selection and set in the select register 462 is determined according to the number of the communication IC's and the load conditions connected to the communication IC's. As shown in FIG. 3, in a case where the eight communication IC's are connected to the side of the communication line 410, the select register 462 is set as shown in FIG. 4.

Figure 5:
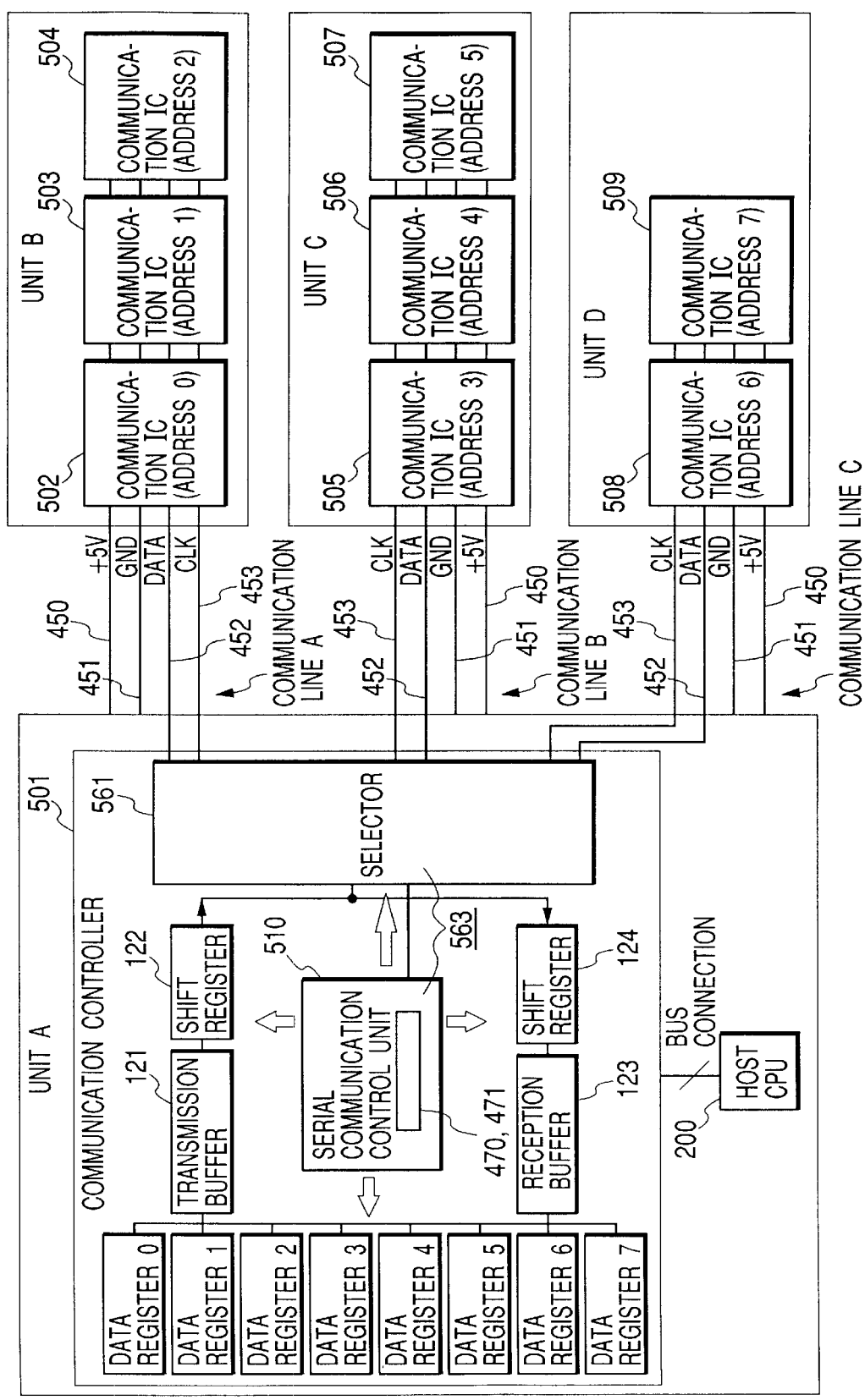
FIG. 5 is a block diagram showing a still another structural example of the serial communication system.

Subsequently, an example of a case where three communication lines are provided as shown in FIG. 5 will be explained. When the number of the communication lines is three, as shown in FIGS. 6A and 6B, the number of the select registers is increased by one byte. Thus, the communication IC's to be connected to the three communication lines are determined, and a clock and a pulse column are outputted only to the objective communication line.

For example, it is assumed that a select register 470 in FIG. 6A is set to be "00000010" (tail address information =2) and a select register 471 in FIG. 6B is set to be "00000101" (tail address information =5). The three lines are called as communication lines A, B and C, respectively. Thus, the communication IC's (from address 0 to address 2) are connected to the line A, the communication IC's (from address 3 to address 5) are connected to the line B, and the communication IC's (from address 6 to address 7) are connected to the line C. Even in the above case where the plural communication lines are provided, it can cope with the communication by increasing the number of the select registers respectively having the connection information.

Subsequently, a second embodiment of the present invention will be explained with reference to FIGS. 7 and 8. It should be noted that explanation of the same parts as those in the first embodiment is omitted, and these parts are added with the same reference numerals as in the first embodiment.

In the present embodiment, a case where two communication lines are provided will be explained. FIG. 7 shows a schematic structure of the serial communication system according to the present invention. A unit A containing a communication controller 701, a unit B containing communication IC's 702 to 705 and a unit C containing communication IC's 706 to 709 are connected by means of +5V lines 450, ground (GND) lines 451, clock (CLK) lines 453 and data (DATA) lines 452.

The communication controller 701 communicates with the communication IC's 702 (address 0) to 709 (address 7) respectively corresponding to data registers 0 to 7, in communication priority order. In the present embodiment, as the address number becomes lower, its communication priority becomes higher.

In a case where communication demands for the plural communication IC's are duplicate, since the communication is performed in the priority order, the communication of the lower priority order is later performed. For the communication IC connected to a load of which delay is not permitted or a load of which speed is high, the address of the higher priority order is selected. Although such a motor, a sensor and the like as described also in the first embodiment are connected to the communication IC's 702 to 709, explanation thereof is omitted in the present embodiment.

Figure 8:
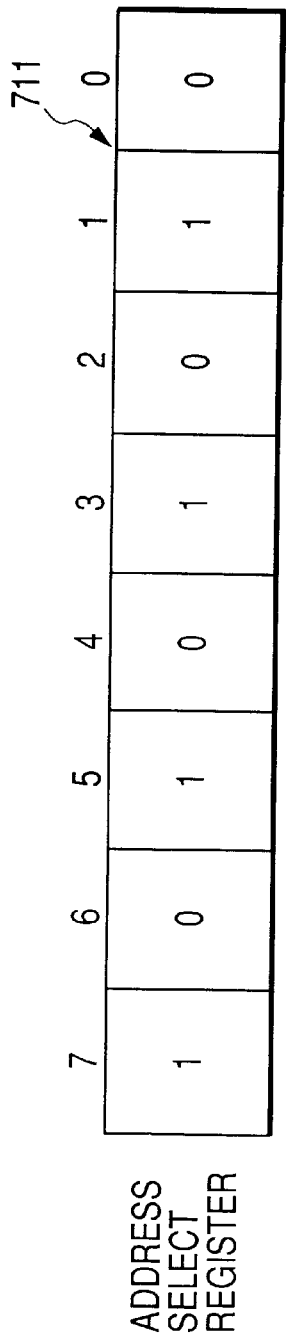
FIG. 8 is a view for explaining a structural example of a select register.

FIG. 8 shows a structural example of a select register 711 provided inside a serial communication control unit 710 of the communication controller 701. It is determined by the select register 711 whether the controller 701 is connected to a communication line 410 or a communication line 411. In this example, since the select register 711 is set to be "10101010", it is represented that the communication IC's (addresses 0, 2, 4 and 6) are connected to the line 410 and the communication IC's (addresses 1, 3, 5 and 7) are connected to the line 411.

As the address number becomes lower, its communication priority becomes higher (i.e., address 0 is highest priority). Therefore, in the case where the communication demands are duplicate, the processes are performed in the order of the communication IC 702 (address 0), the communication IC 706 (address 1), the communication IC 703 (address 2), the communication IC 707 (address 3), . . . , and the communication IC 709 (address 7). In this case, for the same reason as in the first embodiment, information used to alternately and time-divisionally select the communication line in the higher priority order of the communication IC is set in the select register 711. That is, based on the set information, the communication line 410, the communication line 411, the communication line 410, the communication line 411, . . . , are alternately selected.

Subsequently, an example of a transmission operation in which the communication controller 701 writes data into the communication IC 702 (address 0) will be explained.

When a transmission flag is set by a host CPU 200 and transmission data is written into the data register 0, the serial communication control unit 710 selects the data register 0 corresponding to the communication IC 702. At this time, information used to judge which communication line the communication IC 702 corresponding to the data register 0 is to be connected to has been set in the select register 711. The 0-th bit of the select register 711 represents that the communication IC 702 (address 0) is connected to the line 410 side.

Then, the serial communication control unit 710 transfers the data in the data register 0 of the communication controller 701 to a shift register 122 through a transmission buffer 121. At this time, the unit 710 reads the predetermined information set in the select register 711. Thus, according to the information read from the register 711, a selector 461 selects the communication line 410. Then, clock and data are outputted to the selected communication line 410. When the controller 701 communicates with the communication IC 702 in synchronism with such a clock output, the data from the data register 0 is transmitted to the communication IC 702. At this time, any clock or data is not outputted to the communication line 411.

Subsequently, an example of a reception operation in which the communication controller 701 reads data from the communication IC 709 (address 7) will be explained.

Here, predetermined information used to judge which communication line the communication IC 709 corresponding to the data register 7 is to be connected to has been set in the select register 711. Then, the serial communication control unit 710 reads the predetermined information set in the register 711. Thus, according to the information read from the register 711, the selector 461 selects the communication line 411. The clock and the data are outputted to the selected communication line 411. When the controller 701 communicates with the communication IC 709 in synchronism with such a clock output, the data from the communication IC 709 is received by the controller 701. The received data is transferred to the data register 7 through a shift register 124 and a reception buffer 123. At this time, any clock or data is not outputted to the communication line 410.

Even in the case where the plural communication lines are provided, it can cope with the communication by increasing the number of select registers respectively having information representing which communication line the communication IC corresponding to each of the data registers 0 to 7 is connected to.

The present invention can be applied to a system constructed by plural equipments or can be also applied to an apparatus comprising one equipment. Further, it is obviously understood that the present invention can be applied to a case which is achieved by supplying a program to the system or the apparatus. In this case, when a storage medium storing therein a program represented by a software to achieve the present invention is read in the system or the apparatus, such the system or the apparatus can derive the effect of the present invention.

As explained above, the plural communication lines are provided, and the communication lines are time-divisionally selected according to the connection information contents set in the select register to communicate with the predetermined communication IC. Therefore, in the case where the number of the communication IC's connected to the set of the communication lines is large, it is possible to connect all the communication IC's to such the set of the communication lines and then perform the communication. On the other hand, in the case where the number of the communication IC's connected to the set of the communication lines is small, it is possible to connect the communication IC's respectively to the separate communication lines and then perform the multi-system communication. Thus, the communication lines can be time-divisionally selected and replaced according to the number of the communication IC's, the load conditions such as the motor, the sensor and the like connected to the communication IC's, and the like, so that it is possible to provide the system in which the serial communication can be effectively performed.

What is claimed is:

1. A communication apparatus, comprising:

communication means for performing a serial communication with a communication device of a plurality of communication devices connected to a sensor or a motor, each communication device being connected to one of a plurality of communication lines;

connection means for connecting said communication means with one of the plurality of communication lines;

storage means for storing information used to recognize which communication device is connected to which communication line; and control means for recognizing which communication line is connected to the communication device to be communicated with, based on the information stored in said storage means, and for controlling said connection means to connect said communication means with the communication line connected to the communication device to be communicated with.

2. An apparatus according to claim 1, wherein the communication line includes a clock signal line and a data signal line.

3. An apparatus according to claim 1, wherein a plurality of communication devices are cascade-connected to the plurality of communication lines.

4. An apparatus according to claim 1, wherein the plurality of communication devices respectively have addresses, and said communication means sends data representing an address of the communication device to be communicated with through the communication line.

5. An apparatus according to claim 1, wherein said communication means controls driving of the motor by transmitting data to the communication device to which the motor is connected, and said communication means inputs a detection result of the sensor by receiving data from the communication device to which the sensor is connected.

6. An apparatus according to claim 1, wherein said storage means stores connection information written from an another device at a time of initializing said another device.

7. An apparatus according to claim 1, wherein said storage means stores connection information previously stored in a control unit of an image formation device at a time of powering the image formation device.

8. An apparatus according to claim 1, further comprising registers respectively corresponding to the plurality of communication devices on the plurality of communication lines, wherein data to be transmitted to each communication device and data received from each communication device are stored in a respective corresponding register.

9. A communication apparatus, comprising:

a communication unit adapted to perform a serial communication with a communication device of a plurality of communication devices connected to a sensor or a motor, each communication device being connected to one of a plurality of communication lines;

a selector adapted to connect said communication unit with one of the plurality of communication lines; and a register adapted to store information used to recognize which communication device is connected to which communication line, wherein said communication unit recognizes which communication line is connected to the communication device to be communicated with, based on the information stored in said register, and controls said selector to connect with a communication line connected to the communication device to be communicated with.

10. A communication apparatus comprising:

communication means for performing a serial communication with a communication device of a plurality of communication devices that are connected to a sensor or a driver driving a load, each communication device being connected to a communication line of a plurality of communication lines;

connection means for connecting said communication means with a communication line of the plurality of communication lines;

storage means for storing information used to recognize which communication device is connected to which communication line;

control means for recognizing which communication line is connected to the communication device to be communicated with based on the information stored in said storage means, and for controlling said connection means to connect said communication means with the communication line that is connected to the communication device to be communicated with.

11. An apparatus according to claim 10, wherein the communication line includes a clock signal line and a data signal line.

12. An apparatus according to claim 10, wherein the plurality of communication devices are cascade-connected to the plurality of communication lines.

13. An apparatus according to claim 10, wherein the plurality of communication devices respectively have addresses, and said communication means sends data representing an address of the communication device to be communicated with through the communication line.

14. An apparatus according to claim 10, further comprising registers respectively corresponding to the plurality of communication devices connected to the plurality of communication lines, wherein data to be transmitted to each communication device and data received from each communication device are stored in a respective corresponding register.

15. An apparatus according to claim 10, wherein the sensor or the driver is provided in an image forming apparatus.

16. A communication apparatus comprising:

a communication unit, which performs a serial communication with a communication device of a plurality of communication devices that are connected to a sensor or a driver driving a load, each communication device being connected to a communication line of a plurality of communication lines;

a connector, which connects said communication unit with a communication line of the plurality of communication lines; and a register, which stores information used to recognize which communication device is connected to which communication line;

wherein said communication unit recognizes which communication line is connected to the communication device to be communicated with based on the information stored in said register, and controls said connector to connect with the communication line connected to the communication device to be communicated with.

17. An apparatus according to claim 16, wherein the sensor or the driver is provided in an image forming apparatus.

* * * * *

UNITED STATES PATENT AND TRADEMARK OFFICE
CERTIFICATE OF CORRECTION

PATENT NO. : 6,633,581 B2  Page 1 of 1
DATED : October 14, 2003
INVENTOR(S) : Takashi Soya It is certified that error appears in the above-identified patent and that said Letters Patent is hereby corrected as shown below:

<u>Column 2,</u>
Line 51, "not arbitrarily" should read -- not be arbitrarily --.

<u>Column 3,</u>
Lines 14 and 16, "an another" should read -- another --.
Line 17, "a still" should read -- still --.

<u>Column 10,</u>
Line 51, "from an" should read -- from --.

Signed and Sealed this

Sixteenth Day of March, 2004

JON W. DUDAS
*Acting Director of the United States Patent and Trademark Office*